Mar. 27, 1923.
F. I. DEGEN.
GOVERNING MECHANISM.
FILED OCT. 25, 1919.
1,449,736.
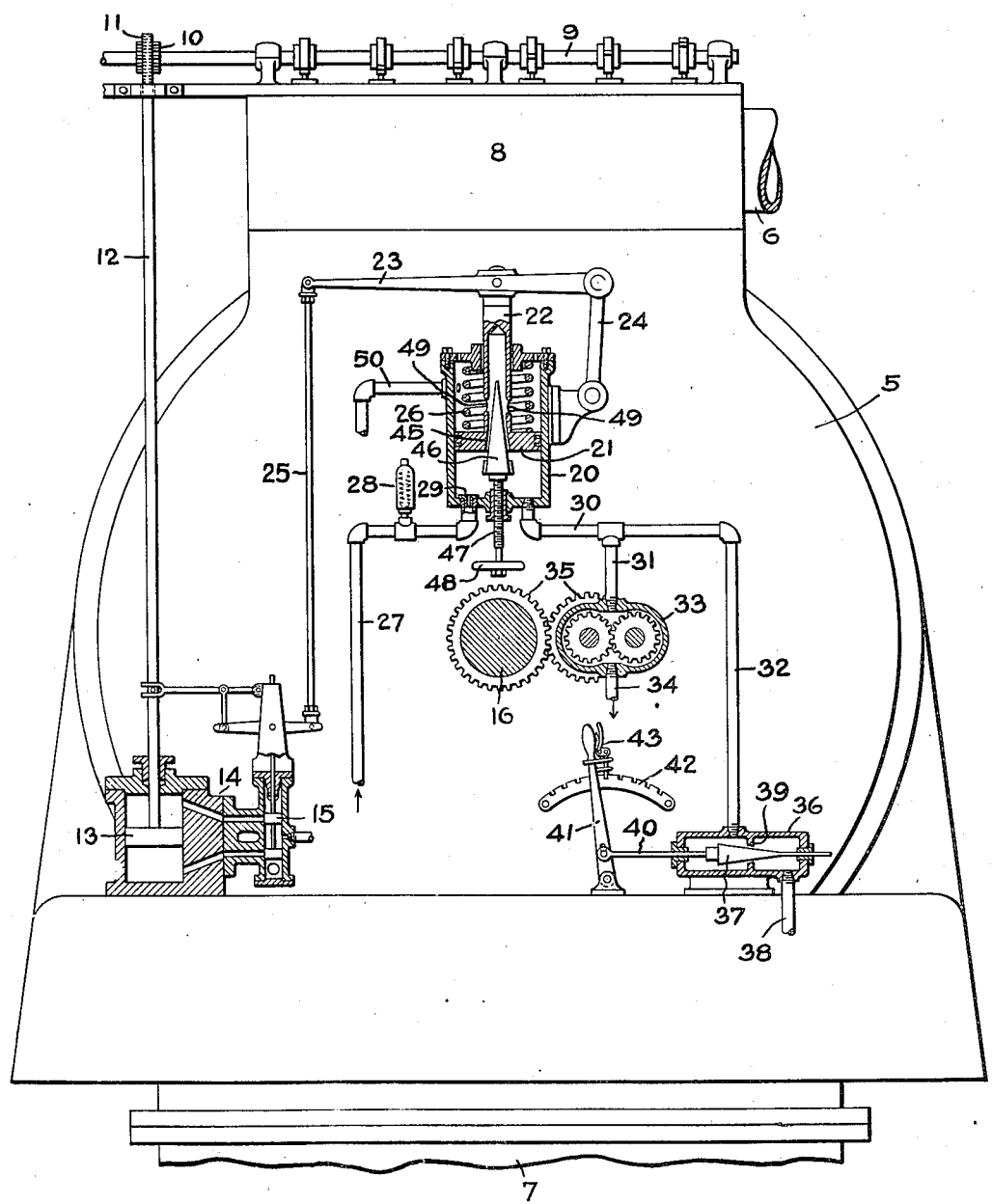
Inventor:
Frederick I. Degen,
by Albert G. Davis
His Attorney.

Patented Mar. 27, 1923.

1,449,736

UNITED STATES PATENT OFFICE.

FREDERICK I. DEGEN, OF SCHENECTADY, NEW YORK, ASSIGNOR TO GENERAL ELECTRIC COMPANY, A CORPORATION OF NEW YORK.

GOVERNING MECHANISM.

Application filed October 25, 1919. Serial No. 333,309.

*To all whom it may concern:*

Be it known that I, FREDERICK I. DEGEN, a citizen of the United States, residing at Schenectady, county of Schenectady, State of New York, have invented certain new and useful Improvements in Governing Mechanisms, of which the following is a specification.

The present invention relates to governing mechanisms such as are used to control the flow of motive fluid to a prime mover in accordance with the load or speed of the prime mover and has for its object to provide an improved structure and arrangement in an apparatus of this character.

For a consideration of what I believe to be novel and my invention, attention is directed to the accompanying description and the claims appended thereto.

In the drawing, the figure is a diagrammatic view of a governing mechanism embodying my invention, the same being shown as controlling the flow of elastic fluid to a turbine. It will be understood, however, that my improved governing mechanism is not limited to use with turbines but may be used in connection with any type of prime mover to which it may be found adapted.

Referring to the drawing, 5 indicates an elastic-fluid turbine having an inlet conduit 6 and an exhaust conduit 7. Conduit 6 leads to an elastic-fluid chest 8 in which are suitable valves which control the flow of fluid from the chest to the turbine. The valves are opened and closed successively by a shaft 9 on the end of which is a gear wheel 10 with which meshes a rack 11 on the end of a rod 12. Rod 12 connects with the piston 13 of a servo-motor 14, the pilot valve of which is indicated at 15. The fluid chest 8, the valve mechanism, and the servo-motor for operating it are of a known type and are shown only by way of example. Any approved or desired form of valve mechanism may be employed. The shaft of the turbine is indicated at 16.

My improved governor mechanism comprises a cylinder 20 in which is located a piston 21 having a stem 22 which at its outer end is connected to a governor lever 23. One end of governor lever 23 is pivoted on a link 24 supported on cylinder 20 and the other end is connected by a rod 25 to the stem of pilot valve 15. This connection includes a usual and well-known arrangement of follow-up device, the function and operation of which is well known and needs no detail description. Surrounding stem 22 and bearing at one end on the upper surface of piston 21 and at the other end against the head of cylinder 20 is a spring 26 which biases the piston toward the bottom of the cylinder. Connected to cylinder 20 below piston 21 is a pressure pipe 27 which may lead from any suitable source of substantially constant fluid pressure, for example the lubricating pump of the oiling system for the turbine. In pipe 27 is a spring-controlled relief valve 28. The connection between pipe 27 and cylinder 20 is through a nipple 29 having an orifice of a predetermined diameter, the arrangement being such that fluid, such as oil, for example, will be continuously supplied through the orifice in nipple 29 to the cylinder where it builds up a pressure against the lower surface of piston 21 tending to move it against the action of spring 26. Connected to cylinder 20 on the side below piston 21 is a discharge pipe 30 having two branches 31 and 32. Branch 31 leads to the casing 33 of a suitable pump driven in accordance with the speed or load on the turbine. It forms the suction pipe of the pump, the discharge pipe being indicated at 34. In the present instance the pump is shown as being a gear pump driven from the turbine shaft 16 by gear wheels 35, and this is the type of pump I prefer to utilize, although any form of pump which creates a suction pressure on its inlet side which bears a definite relation to the speed at which it is driven may be utilized. Branch pipe 32 leads to a casing 36 in which is a valve 37 which controls the flow of fluid from pipe 32 to a waste pipe 38. Valve 37 comprises a long, conical body cooperating with a valve seat 39 so that fine adjustments of the valve opening may be made, and has its stem 40 connected to an operating lever 41, which moves over a segment 42 and is provided with a latch 43 for engaging notches in such segment. By this arrangement valve 37 may be adjusted and latched in the desired position. Connecting the cylinder spaces on opposite sides of piston 21 is a by-pass, the area of which is varied in accordance with the position of the piston in the cylinder so that as the piston moves up and down the area of the by-pass becomes greater and smaller. In the present instance the by-pass comprises a tapered opening 45 through the central portion of piston 21 in which opening is a cone-shaped valve member 46. Valve member 46 is carried on the end of a rod 47 which has threaded engagement with the base of cylinder 20. On the lower end of rod 47 is a hand wheel 48 to be used in adjusting the position of valve member 46. Stem 22 is made hollow for a portion of its length to accommodate the end of valve member 46 and in it are openings 49 which serve to connect the interior of the stem with the exterior so that fluid flowing from below piston 21 through opening 45 may pass to the space above piston 21. Connected with the space above piston 21 is a drain or waste pipe 50. Waste pipes 34, 38 and 50 may all lead to any suitable point such as a fluid tank. It will be clear that the foregoing arrangement forms in substance a by-pass or discharge conduit from beneath piston 21, the area of which is varied by movements of the piston, and instead of using the specific arrangement shown other valve arrangements may be used as found desirable.

The operation is as follows: Assume that the turbine is running and that pipe 27 is supplying fluid at constant pressure to the cylinder space below piston 21. Also that valve 37 has been set by lever 41 for the desired turbine speed. A part of the fluid supplied to the cylinder space below piston 21 by pipe 27 will leak past valve 46 and out by way of waste pipe 50; a part will pass through pipes 30 and 32 and past valve 37 to waste pipe 38, and a part will be pumped through pipes 30 and 31 by the gear pump and discharged through pipe 34. As a result a certain pressure will be built up below piston 21 which will position piston 21 in a definite position against the action of spring 26 and give the valve mechanism in fluid chest 8 a setting which will admit just sufficient elastic fluid to the turbine to maintain the desired speed. If now the speed of the turbine increases, the gear pump will be driven faster and will suck fluid faster from beneath piston 21. This will decrease the pressure beneath piston 21 and spring 26 will therefore move the piston downward. Downward movement of piston 21 will lower the left-hand end of governor lever 23 thereby moving downward pilot valve 15 which causes the servomotor to operate to change the setting of the valve mechanism in chest 8 so as to decrease the amount of elastic fluid admitted to the turbine and thus bring its speed back to the desired operating speed. On the other hand, if the speed of the turbine decreases, then the gear pump will pump less fluid from beneath piston 21 with the result that the pressure beneath piston 21 will build up thereby moving piston 21 upward against the action of spring 26. This moves the left-hand end of governor lever 23 and also pilot valve 15 upward so that the servo-motor will operate the valve mechanism in chest 8 in a direction to increase the amount of elastic fluid admitted to the turbine and bring the speed back to normal. The supply of fluid through pipe 27 is maintained at substantially constant pressure and the orifice through nipple 29 is such as to supply the desired amount of fluid to the cylinder space.

The valve member 46 is adjusted to the desired position and remains stationary. However, it will be noted that the arrangement is such that when piston 21 moves downward, owing to the tapered arrangement, the area of the passage past valve 46 is decreased so that less fluid can escape through it, while when piston 21 moves upward such area is increased which permits more fluid to escape through it. The result is that a movement of piston 21 acts in opposition to the gear pump and tends to counteract the pumping effects due to increases and decreases in the speed of the pump. For example, when the speed of the gear pump increases, thus sucking fluid more rapidly from under piston 21 and causing it to move downward, such downward movement decreases the area of the passage past valve member 46 so that less fluid can flow past it, which of course results in tending to increase the pressure beneath piston 21, thereby arresting its downward movement, and counteracting the effect caused by the increased amount of fluid which the gear pump is pumping from beneath the piston. On the other hand, when the speed of the gear pump decreases, thus pumping less fluid from beneath piston 21 and causing the pressure under it to build up and move it upward, such upward movement increases the area of the passage past valve member 46 so that more fluid can escape through it which as is obvious counteracts the effect of less fluid being pumped away by the gear pump. This arrangement forms in substance the equivalent of a follow-up device, that is, it functions in the same manner, and prevents overtravel, or hunting of the governor. By adjusting the position of valve member 46 the sensitiveness of the governor can be made whatever is desired. Also, by reversing the tapered cone arrangement the reverse valve action may be obtained which would give a very narrow regulation of the governor.

The setting of the governor may be changed by changing the position of valve 37 to increase or decrease the area of the discharge passage past it. When the area is increased, more fluid can escape past it with the result that the turbine speed will be lowered, while when the area is decreased, less fluid can escape past it with the result that the turbine speed will be raised. This provides a very easy and exact means for setting the governor to give the desired turbine speed. It is also a means which can be operated when the turbine is running and which can be adjusted with great nicety.

The foregoing arrangement provides a very sensitive governor which can be set to operate at any point through a wide range of speed, it being only necessary to adjust the valves 37 and 46 to give the results desired. Also it will be noted that a movement of piston 21 downward, due to the action of spring 26, moves the valve mechanism in chest 8 toward closed position. This being the case should the fluid pressure in pipe 27 or beneath piston 21 fail, the valve mechanism in chest 8 will be automatically closed thus shutting down the machine. This is an important consideration.

It will be apparent, of course, that the governor mechanism instead of being connected to the valve mechanism of the prime mover through a servo-motor may be connected thereto directly or otherwise and also that pipe 32 instead of leading from the particular point in the system shown, may lead from any other suitable point where the flow of fluid through it will modify the the pressure under piston 21.

In accordance with the provisions of the patent statutes, I have described the principle of operation of my invention, together with the apparatus which I now consider to represent the best embodiment thereof; but I desire to have it understood that the apparatus shown is only illustrative, and that the invention may be carried out by other means.

What I claim as new and desire to secure by Letters Patent of the United States, is:—

1. In a governor mechanism, the combination of a movable abutment, means for supplying fluid under pressure to said abutment to move it, a by-pass passage for the abutment, the area of which varies with the position of the abutment, pump means for pumping fluid away from said abutment, said pump means having a pumping action which bears a definite relation to the rate at which it is driven, and a manually regulated valve means for varying the setting of the mechanism.

2. In a governor mechanism, the combination of a movable abutment, means for supplying fluid under pressure to said abutment to move it, pump means for pumping fluid away from said abutment, said pump means having a pumping action which bears a definite relation to the rate at which it is driven, and a discharge conduit associated with the abutment and provided with a manually operated regulating valve therein, whereby the sensitiveness of the governor may be regulated.

3. In a governor mechanism, the combination of a movable abutment, means for supplying fluid under pressure to said abutment to move it, a by-pass passage for the abutment, the area of which varies with the position of the abutment, pump means for pumping fluid away from said abutment, said pump means having a pumping action which bears a definite relation to the rate at which it is driven, and a discharge conduit associated with the abutment and provided with a manually operated regulating valve therein, whereby the sensitiveness of the governor may be regulated.

4. In a governor mechanism, the combination of a cylinder, a piston therein, a conduit connected to the cylinder on one side of the piston for supplying thereto fluid at substantially constant pressure, pump means for withdrawing fluid from such side of the piston at a rate proportional to the speed at which it is driven, a discharge passage leading from such side of the piston, the area of which varies with movements of the piston, a second discharge passage in multiple to the pump, and a manually operated valve therein for varying the flow through said passage whereby the setting of the governor may be changed.

5. In a governor mechanism, the combination of a cylinder, a piston therein, a conduit connected to the cylinder on one side of the piston for supplying thereto fluid at substantially constant pressure, pump means for withdrawing fluid from such side of the piston at a rate proportional to the speed at which it is driven, a second discharge passage leading from such side of the piston, and means for controlling the area thereof.

6. In a governor mechanism, the combination of a cylinder, a piston therein having an opening through it, a conduit connected to the cylinder on one side of the piston for supplying thereto fluid at substantially constant pressure, pump means for withdrawing fluid from such side of the piston at a rate proportional to the speed at which it is driven, and a tapered valve member projecting into said opening.

7. The combination with a prime mover, of a governor therefor comprising a casing, a movable element therein, a conduit for supplying fluid under substantially constant pressure on one side of said element, means for withdrawing fluid from such side of said element at a rate which bears a definite relation to the speed of the prime mover, and means forming a discharge passage from such side of said element, the area of which varies with movements of the element in such manner that when the element moves due to increase of speed said area becomes less while when said element moves due to decrease in speed said area becomes greater.

8. The combination with a prime mover, of a governor therefor comprising a casing, a movable element therein, a conduit for supplying fluid under substantially constant pressure on one side of said element, means for withdrawing fluid from such side of said element at a rate which bears a definite relation to the speed of the prime mover, means forming a discharge passage from such side of said element, the area of which varies with movements of the element in such manner that when the element moves due to increase of speed said area becomes less while when said element moves due to decrease in speed said area becomes greater, means forming a second discharge passage from such side of said element, and valve means for varying the area of it.

9. The combination with a prime mover having a shaft and a valve mechanism for controlling the admission of elastic fluid, of a governor comprising a cylinder, a piston therein having its stem connected to said valve mechanism, a conduit connected to the cylinder on one side of the piston for supplying fluid at substantially constant pressure thereto to build up a pressure on said piston, means opposing movement of said piston due to said pressure, means driven by said shaft and connected to the cylinder on the said one side of the piston for pumping fluid therefrom at a rate bearing a definite relation to the speed of the shaft, and a regulable discharge conduit also connected with the cylinder on such side of said piston.

10. The combination with a prime mover having a shaft and a valve mechanism for controlling the admission of elastic fluid, of a governor comprising a cylinder, a piston therein having its stem connected to said valve mechanism, a conduit connected to the cylinder on one side of the piston for supplying fluid at substantially constant pressure thereto to build up a pressure on said piston, means opposing movement of said piston due to said pressure, means driven by said shaft and connected to the cylinder on the said one side of the piston for pumping fluid therefrom at a rate bearing a definite relation to the speed of the shaft, and a discharge conduit connected with the cylinder on such side of said piston, the area of which varies with movements of said piston in such manner that the change in area acts in opposition to the pump means.

11. In a governor mechanism, the combination of a casing, a movable member therein, pump means associated with the casing for maintaining a fluid pressure therein to position the movable member in accordance with an operating condition of the machine being governed, and a discharge conduit associated with the casing, the area of which is varied by movements of said movable member in a direction to counteract the action of the pump means.

12. The combination with a prime mover having a valve mechanism, of a governor mechanism therefor comprising a casing, a movable member therein connected to the valve mechanism, means biasing said movable member toward a position in which the valve mechanism is closed, pump means driven by the prime mover for building up a fluid pressure on one side of said movable member to position it against the action of said biasing means, and a discharge conduit, the area of which is varied in accordance with the position of said movable member and in such manner as to counteract changes in the action of said pump means.

In witness whereof, I have hereunto set my hand this 24th day of October, 1919.

FREDERICK I. DEGEN.